US009063693B2

(12) United States Patent
Raken et al.

(10) Patent No.: US 9,063,693 B2
(45) Date of Patent: Jun. 23, 2015

(54) PERIPHERAL DEVICE STORAGE

(75) Inventors: Jan Raken, Seattle, WA (US); Andrew W. Hill, Redmond, WA (US); Robert J. Bingham, Jr., Everett, WA (US); Peter Kyriacou, Seattle, WA (US); Robyn Rebecca Reed McLaughlin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/603,918

(22) Filed: Sep. 5, 2012

(65) Prior Publication Data

US 2013/0335903 A1 Dec. 19, 2013

Related U.S. Application Data

(60) Provisional application No. 61/659,342, filed on Jun. 13, 2012.

(51) Int. Cl.
H05K 5/00 (2006.01)
H05K 7/00 (2006.01)
E04G 3/00 (2006.01)
G06F 1/16 (2006.01)
G06F 3/0354 (2013.01)

(52) U.S. Cl.
CPC ...... *G06F 1/1613* (2013.01); *G06F 2200/1632* (2013.01); *G06F 3/03545* (2013.01)

(58) Field of Classification Search
CPC ............. H05K 5/0026; H05K 5/026; H05K 2201/10159; G06F 1/16; G06F 1/33225
USPC ............ 361/679.01, 679.02, 679.08, 679.09, 361/679.2, 679.3, 679.26–679.29, 361/679.37–679.39, 679.4, 679.41–679.44, 361/679.55–679.59; 455/575.1, 575.3, 455/575.4, 575.8
See application file for complete search history.

(56) References Cited

U.S. PATENT DOCUMENTS

| 4,279,021 A | 7/1981 | See et al. |
| 4,326,193 A | 4/1982 | Markley et al. |
| 5,510,783 A | 4/1996 | Findlater et al. |
| 5,576,981 A | 11/1996 | Parker et al. |
| 6,147,859 A | 11/2000 | Abboud |

(Continued)

FOREIGN PATENT DOCUMENTS

| GB | 2178570 | 2/1987 |
| JP | 11345041 | 12/1999 |

(Continued)

OTHER PUBLICATIONS

"Cholesteric Liquid Crystal", Retrieved from: <http://en.wikipedia.org/wiki/Cholesteric_liquid_crystal> on Aug. 6, 2012,(Jun. 10, 2012), 2 pages.

(Continued)

*Primary Examiner* — Jerry Wu
(74) *Attorney, Agent, or Firm* — Jeremy Snodgrass; Judy Yee; Micky Minhas

(57) ABSTRACT

Peripheral device storage techniques are described. In one or more implementations, a computing device includes a housing and a power connection port that is configured to form a physical coupling to a peripheral device sufficient to retain the peripheral device against the housing and form an electrical coupling configured to receive power at the computing device from a power adapter.

25 Claims, 6 Drawing Sheets

(56) References Cited

U.S. PATENT DOCUMENTS

| | | | |
|---|---|---|---|
| 6,266,685 B1 | 7/2001 | Danielson et al. | |
| 6,442,764 B1 | 9/2002 | Badillo et al. | |
| 6,738,049 B2 | 5/2004 | Kiser et al. | |
| 6,864,573 B2 | 3/2005 | Robertson et al. | |
| 7,091,955 B2 | 8/2006 | Kramer | |
| 7,095,404 B2 | 8/2006 | Vincent et al. | |
| 7,116,309 B1 | 10/2006 | Kimura et al. | |
| 7,202,837 B2 | 4/2007 | Ihara | |
| 7,401,992 B1* | 7/2008 | Lin | 401/195 |
| 7,423,557 B2 | 9/2008 | Kang | |
| 7,622,907 B2 | 11/2009 | Vranish | |
| 7,623,121 B2 | 11/2009 | Dodge | |
| 7,639,876 B2 | 12/2009 | Clary et al. | |
| 7,817,428 B2 | 10/2010 | Greer, Jr. et al. | |
| 7,907,394 B2 | 3/2011 | Richardson et al. | |
| 8,269,093 B2 | 9/2012 | Naik et al. | |
| 8,363,036 B2 | 1/2013 | Liang | |
| 2001/0035859 A1 | 11/2001 | Kiser | |
| 2002/0000977 A1 | 1/2002 | Vranish | |
| 2002/0126445 A1 | 9/2002 | Minaguchi et al. | |
| 2002/0154099 A1 | 10/2002 | Oh | |
| 2002/0188721 A1 | 12/2002 | Lemel et al. | |
| 2003/0016282 A1 | 1/2003 | Koizumi | |
| 2003/0044215 A1 | 3/2003 | Monney et al. | |
| 2003/0132916 A1 | 7/2003 | Kramer | |
| 2004/0005184 A1 | 1/2004 | Kim et al. | |
| 2004/0100457 A1 | 5/2004 | Mandle | |
| 2004/0174670 A1 | 9/2004 | Huang et al. | |
| 2004/0190239 A1 | 9/2004 | Weng et al. | |
| 2004/0212598 A1 | 10/2004 | Kraus et al. | |
| 2005/0057521 A1 | 3/2005 | Aull et al. | |
| 2005/0190159 A1 | 9/2005 | Skarine | |
| 2005/0240949 A1 | 10/2005 | Liu et al. | |
| 2006/0082973 A1 | 4/2006 | Egbert et al. | |
| 2006/0103633 A1 | 5/2006 | Gioeli | |
| 2006/0181521 A1 | 8/2006 | Perreault et al. | |
| 2006/0197755 A1* | 9/2006 | Bawany | 345/179 |
| 2006/0238510 A1 | 10/2006 | Panotopoulos et al. | |
| 2007/0051766 A1 | 3/2007 | Spencer | |
| 2007/0051792 A1 | 3/2007 | Wheeler et al. | |
| 2007/0247338 A1 | 10/2007 | Marchetto | |
| 2007/0257821 A1 | 11/2007 | Son et al. | |
| 2008/0018611 A1 | 1/2008 | Serban et al. | |
| 2008/0180411 A1* | 7/2008 | Solomon et al. | 345/179 |
| 2008/0232061 A1* | 9/2008 | Wang et al. | 361/686 |
| 2008/0297878 A1 | 12/2008 | Brown et al. | |
| 2008/0309636 A1 | 12/2008 | Feng et al. | |
| 2009/0002218 A1 | 1/2009 | Rigazio et al. | |
| 2009/0007001 A1 | 1/2009 | Morin et al. | |
| 2009/0046416 A1 | 2/2009 | Daley, III | |
| 2009/0049979 A1 | 2/2009 | Naik et al. | |
| 2009/0065267 A1 | 3/2009 | Sato | |
| 2009/0135142 A1 | 5/2009 | Fu et al. | |
| 2009/0182901 A1 | 7/2009 | Callaghan et al. | |
| 2009/0219250 A1 | 9/2009 | Ure | |
| 2010/0001963 A1 | 1/2010 | Doray et al. | |
| 2010/0021022 A1 | 1/2010 | Pittel et al. | |
| 2010/0075517 A1* | 3/2010 | Ni et al. | 439/131 |
| 2010/0103131 A1 | 4/2010 | Segal et al. | |
| 2010/0162109 A1 | 6/2010 | Chatterjee et al. | |
| 2010/0188338 A1 | 7/2010 | Longe | |
| 2010/0231556 A1 | 9/2010 | Mines et al. | |
| 2010/0238119 A1 | 9/2010 | Dubrovsky et al. | |
| 2010/0245221 A1 | 9/2010 | Khan | |
| 2010/0321301 A1 | 12/2010 | Casparian et al. | |
| 2011/0007008 A1 | 1/2011 | Algreatly | |
| 2011/0050587 A1 | 3/2011 | Natanzon et al. | |
| 2011/0057899 A1 | 3/2011 | Sleeman et al. | |
| 2011/0095994 A1 | 4/2011 | Birnbaum | |
| 2011/0096513 A1 | 4/2011 | Kim | |
| 2011/0234502 A1 | 9/2011 | Yun et al. | |
| 2011/0248941 A1 | 10/2011 | Abdo et al. | |
| 2011/0267300 A1 | 11/2011 | Serban et al. | |
| 2011/0304962 A1 | 12/2011 | Su | |
| 2012/0068933 A1 | 3/2012 | Larsen | |
| 2012/0072167 A1 | 3/2012 | Cretella, Jr. et al. | |
| 2012/0087078 A1* | 4/2012 | Medica et al. | 361/679.31 |
| 2012/0099263 A1 | 4/2012 | Lin | |
| 2012/0106082 A1 | 5/2012 | Wu et al. | |
| 2012/0155015 A1 | 6/2012 | Govindasamy et al. | |
| 2012/0235921 A1 | 9/2012 | Laubach | |
| 2012/0287562 A1 | 11/2012 | Wu et al. | |
| 2012/0328349 A1 | 12/2012 | Isaac et al. | |
| 2013/0050922 A1 | 2/2013 | Lee et al. | |
| 2013/0107144 A1 | 5/2013 | Marhefka et al. | |
| 2013/0229386 A1 | 9/2013 | Bathiche | |
| 2013/0278552 A1 | 10/2013 | Kamin-Lyndgaard | |
| 2013/0335330 A1 | 12/2013 | Lane | |
| 2013/0335902 A1 | 12/2013 | Campbell | |
| 2013/0342464 A1 | 12/2013 | Bathiche et al. | |
| 2013/0342465 A1 | 12/2013 | Bathiche | |
| 2013/0346636 A1 | 12/2013 | Bathiche | |

FOREIGN PATENT DOCUMENTS

| | | |
|---|---|---|
| NL | 1038411 | 5/2012 |
| WO | WO-2010011983 | 1/2010 |
| WO | WO-2012036717 | 3/2012 |

OTHER PUBLICATIONS

"i-Interactor electronic pen", Retrieved from: <http://www.alibaba.com/product-gs/331004878/i_Interactor_electronic_pen.html> on Jun. 19, 2012, 5 pages.

"MPC Fly Music Production Controller", AKAI Professional, Retrieved from: <http://www.akaiprompc.com/mpc-fly> on Jul. 9, 2012, 4 pages.

"Reflex LCD Writing Tablets", retrieved from <http://www.kentdisplays.com/products/lcdwritingtablets.html> on Jun. 27, 2012, 3 pages.

"Smart Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>,(2009), 2 pages.

Qin, Yongqiang et al., "pPen: Enabling Authenticated Pen and Touch Interaction on Tabletop Surfaces", In Proceedings of ITS 2010, Available at <http://www.dfki.de/its2010/papers/pdf/po172.pdf>,(Nov. 2010), pp. 283-284.

Sumimoto, Mark "Touch & Write: Surface Computing With Touch and Pen Input", Retrieved from: <http://www.gottabemobile.com/2009/08/07/touch-write-surface-computing-with-touch-and-pen-input/> on Jun. 19, 2012,(Aug. 7, 2009), 4 pages.

"International Search Report and Written Opinion", Application No. PCT/US2013/044871, (Aug. 14, 2013), 12 pages.

"International Search Report and Written Opinion", Application No. PCT/US2013/045049, (Sep. 16, 2013), 9 pages.

"Write & Learn Spellboard Advanced", Available at <http://somemanuals.com/VTECH,WRITE%2526LEARN--SPELLBOARD--ADV--71000,JIDFHE.PDF>, (2006) 22 pages.

Bathiche, Steven N., et al., "Input Device with Interchangeable Surface", U.S. Appl. No. 13/974,749, (Aug. 23, 2013), 51 pages.

Lance, David M., et al., "Media Processing Input Device", U.S. Appl. No. 13/655,065, (Oct. 18, 2012), 43 pages.

"International Search Report and Written Opinion", Application No. PCT/US2013/044873, Nov. 22, 2013, 9 pages.

Van "Lenovo Thinkpad Tablet 2 Review", Retrieved from: <http://www.digitaltrends.com/tablet-reviews/lenovo-thinkpad-tablet-2-review/> Jan. 29, 2014, Feb. 12, 2013, 7 Pages.

"International Search Report and Written Opinion", Application No. PCT/US2013/045283, Mar. 12, 2014, 19 pages.

"Microsoft Tablet PC", Retrieved from <http://web.archive.org/web/20120622064335/https://en.wikipedia.org/wiki/Microsoft_Tablet_PC> on Jun. 4, 2014, Jun. 21, 2012, 9 pages.

"Non-Final Office Action", U.S. Appl. No. 13/599,763, May 28, 2014, 6 pages.

"Non-Final Office Action", U.S. Appl. No. 13/655,065, Apr. 24, 2014, 16 pages.

(56) References Cited

OTHER PUBLICATIONS

"Non-Final Office Action", U.S. Appl. No. 13/974,994, Jun. 4, 2014, 24 pages.
"Non-Final Office Action", U.S. Appl. No. 13/975,087, May 8, 2014, 18 pages.
"Ex Parte Quayle Action", U.S. Appl. No. 13/599,763, Nov. 14, 2014, 6 pages.
"Final Office Action", U.S. Appl. No. 13/655,065, Aug. 8, 2014, 20 pages.
"Final Office Action", U.S. Appl. No. 13/974,994, Oct. 6, 2014, 26 pages.
"Final Office Action", U.S. Appl. No. 13/975,087, Sep. 10, 2014, 19 pages.
"Non-Final Office Action", U.S. Appl. No. 13/647,479, Jul. 3, 2014, 10 pages.
"Final Office Action", U.S. Appl. No. 13/647,479, filed Dec. 12, 2014, 12 pages.
"Non-Final Office Action", U.S. Appl. No. 13/655,065, filed Dec. 19, 2014, 24 pages.
"Non-Final Office Action", U.S. Appl. No. 13/974,994, filed Jan. 23, 2015, 26 pages.
"Non-Final Office Action", U.S. Appl. No. 13/975,087, filed Feb. 27, 2015, 20 pages.
"Notice of Allowance", U.S. Appl. No. 13/599,763, filed Feb. 18, 2015, 4 pages.
"Snugg iPad 3 Keyboard Case—Cover Ultra Slim Bluetooth Keyboard Case for the iPad 3 & iPad 2", Retrieved from <https://web.archive.org/web/20120810202056/http://www.amazon.com/Snugg-iPad-Keyboard-Case-Bluetooth/dp/B008CCHXJE> on Jan. 23, 2015, Aug. 10, 2012, 4 pages.
"Writer 1 for iPad 1 keyboard + Case (Aluminum Bluetooth Keyboard, Quick Eject and Easy Angle Function!)", Retrieved from <https://web.archive.org/web/20120817053825/http://www.amazon.com/keyboard-Aluminum-Bluetooth-Keyboard-Function/dp/B004OQLSLG> on Jan. 23, 2015, Aug. 17, 2012, 5 pages.
"Final Office Action", U.S. Appl. No. 13/655,065, Apr. 2, 2015, 23 pages.

* cited by examiner

PERIPHERAL DEVICE STORAGE

RELATED APPLICATIONS

This application claims priority under 35 U.S.C. §119(e) to U.S. Provisional Application No. 61/659,342, filed Jun. 13, 2012, and titled "Stylus Storage," the entire disclosure of which is hereby incorporated by reference.

BACKGROUND

Tablet computing devices sometimes include alternative input devices, such as a stylus. Storing of a stylus, however, may create a couple of design challenges. There are two conventional solutions to this problem. In a first example, an internal slot is used to store and retain the stylus through friction or through a push-push type mechanism. This may create a problem where extra space and parts are required inside the device, thereby increasing the complexity of the device and may therefore hinder the user's experience with the device. In another example a lanyard and a pen cap are used. This conventional solution may also create problems. The lanyard, for instance, may operate somewhat as an uncontrolled appendage and therefore get caught on other objects, pen caps tend to let the pen fall out due to limitations of a retention force that may be used, and so on.

SUMMARY

Peripheral device storage techniques are described. In one or more implementations, a computing device includes a housing and a power connection port that is configured to form a physical coupling to a peripheral device sufficient to retain the peripheral device against the housing and form an electrical coupling configured to receive power at the computing device from a power adapter.

In one or more implementations, a stylus includes a housing of a computing device configured to be grasped by a hand of a user and a protrusion disposed on the housing, the protrusion configured to form a physical coupling to a power connection port of the computing device that is sufficient to retain the housing against the computing device.

In one or more implementation, a system includes a device having a protrusion. The system also includes a computing device having a power connection port that is configured to form a magnetic physical coupling to the protrusion of the device sufficient to retain the stylus against the computing device and form an electrical coupling configured to receive power at the computing device from a power adapter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Computing devices may employ a wide range of peripheral devices to support different types of user interaction with the device. This may include input devices that are configured to be used in addition to the computing device, an example of which is a stylus. However, conventional techniques that were utilized to store peripheral devices were often cumbersome and hindered a user's interaction with both the peripheral device and the computing device.

Computing device peripheral storage techniques are described. In one or more implementations, a computing device includes a power connection port. The power connection port is configured to be physically (e.g., through the use of magnetism) and electrically connected to a power adapter. In this way, the computing device may receive power to operate the computing device as well as charge a battery of the computing device.

The magnetism of the power connection port may also be leveraged for storage of a peripheral device, an example of which is a stylus. The stylus may include a protrusion that is configured to be received and retained within the power connection port. This may cause the stylus to be physically secured to the computing device for storage of the stylus. In this way, the power connection port of the computing device may be employed for a variety of functionality, thereby supporting a mobile form factor of the computing device. A variety of other features may also be supported, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
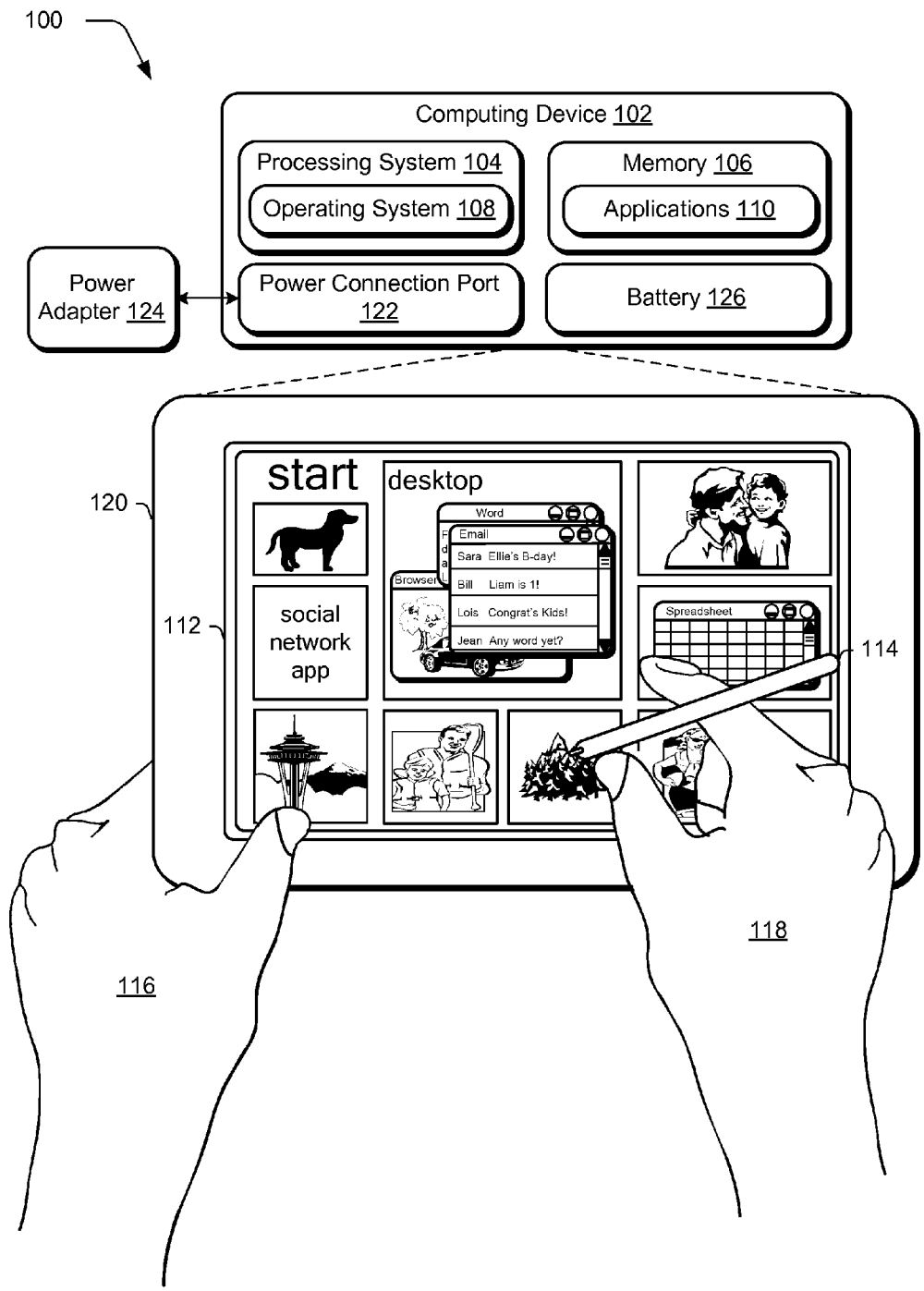
FIG. 1 is an illustration of an environment in an example implementation that is operable to employ the techniques described herein to secure a peripheral device.

FIG. 1 is an illustration of an environment 100 in an example implementation that is operable to employ techniques described herein. The illustrated environment 100 includes a computing device 102 having a processing system 104 and a computer-readable storage medium that is illustrated as a memory 106 although other confirmations are also contemplated as further described below.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on. Further discussion of different configurations that may be assumed by the computing device may be found in relation to FIG. 7.

The computing device 102 is further illustrated as including an operating system 108. The operating system 108 is configured to abstract underlying functionality of the computing device 102 to applications 110 that are executable on the computing device 102. For example, the operating system 108 may abstract the processing system 104, memory 106, network, and/or display device 112 functionality of the computing device 102 such that the applications 110 may be written without knowing "how" this underlying functionality is implemented. The application 110, for instance, may provide data to the operating system 108 to be rendered and displayed by the display device 112 without understanding how this rendering will be performed. The operating system 108 may also represent a variety of other functionality, such as to manage a file system and user interface that is navigable by a user of the computing device 102.

The computing device 102 may support a variety of different interactions. For example, the computing device 102 may include one or more hardware devices that are manipulable by a user to interact with the device, which may include peripheral devices such as a keyboard, cursor control device (e.g., mouse), a stylus 114, and so on.

In the illustrated example, first and second hands 116, 118 of a user are shown. The first hand 116 of the user is shown as holding a housing 120 of the computing device 102. The second hand 118 of the user is illustrated as providing one or more inputs using the stylus 114 that are detected using touchscreen functionality of the display device 112 to perform an operation, such as to launch an application. Thus, recognition of the inputs may be leveraged to interact with a user interface output by the computing device 102, such as to interact with a game, an application, browse the internet, change one or more settings of the computing device 102, and so forth. Although a stylus 114 is shown, a variety of other peripheral devices are also contemplated, such as a mouse or other cursor control device, output device, and so on.

The computing device 102 is also illustrated as including a power connection port 122. The power connection port 122 is configured to form a physical and electrical coupling to a power adapter 124 to obtain operational power, which may including charging a battery 126 of the computing device 102. For example, the power connection port 122 may be configured to magnetically couple to a cord of the power adapter 124. Once coupled, the power connection port 122 may receive power of the power adapter 124 from an electrical wall socket. In this way, the computing device 102 may obtain power "from the grid" to operate. The power connection port 122 may also be leveraged for a variety of other purposes, such as to secure a peripheral device, further discussion of which may be found beginning in relation to the following figure.

Figure 2:
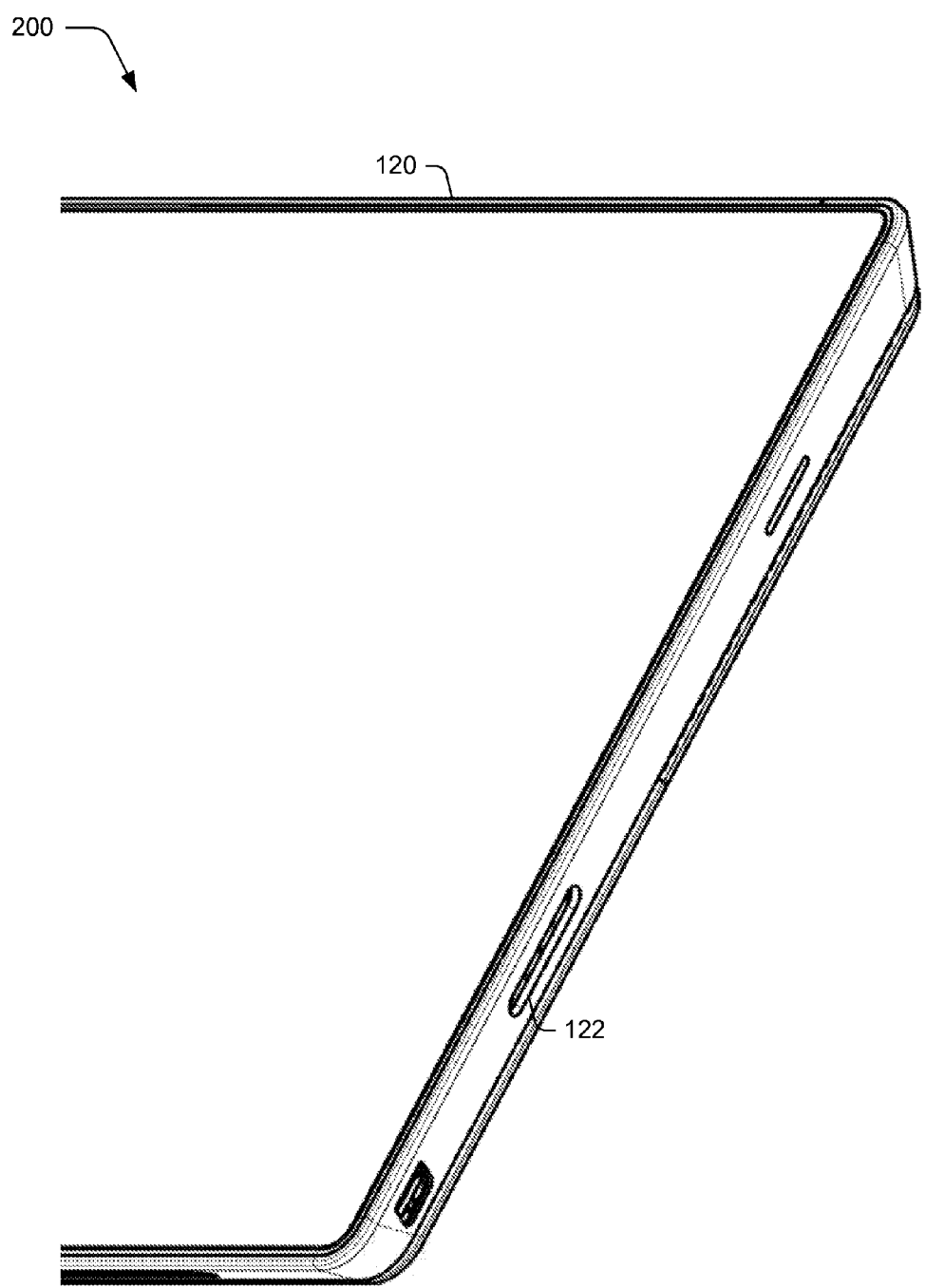
FIG. 2 depicts a side view of a housing of a computing device of FIG. 1 showing a power connection port in greater detail.

FIG. 2 depicts a side view 200 of the housing 120 of the computing device 102 of FIG. 1 showing the power connection port 122 in greater detail. In this side view, a right side of the housing 120 of FIG. 1 is illustrated which includes the power connection port 122 formed as having a recess. The power connection port 122 may thus be configured in this example to receive a protrusion formed at an end of a plug of the power adapter 124 to charge the computing device 102.

For example, a magnet of the power connection port 122 may be configured to attract a ferrous connection portion of the power adapter 124 thus forming a physical connection between the two using magnetism. Further, this design may help protect against inadvertent contact with the power connection port 122, which may cause grounding, potential harm to a user, and so on. As previously described, the power connection port 122 may also be configured to support storage of a peripheral device, an example of which may be found in relation to the following figure. Although a power connection port 122 is described, other magnetic devices may also be leveraged of the computing device 102 to provide similar functionality. Further, the power connection port 122 itself may also support a variety of functionality, such as to also communicate data by provide a physical connection with a peripheral device.

Figure 3:
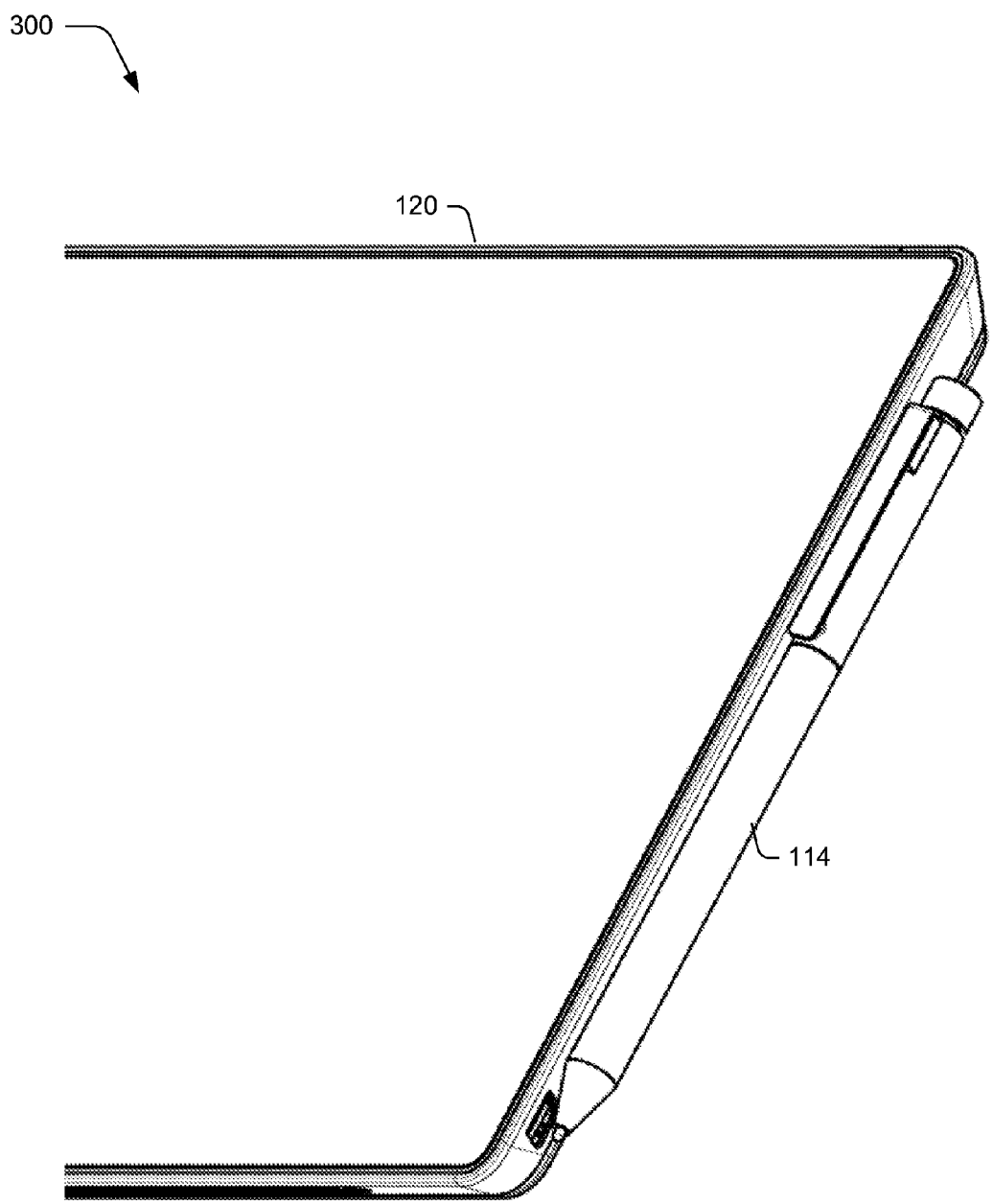
FIG. 3 illustrates an implementation depicting a side view of the housing of the computing device of FIG. 2 as securing a peripheral device using the power connection port.

FIG. 3 illustrates an implementation 300 depicting the side view 200 of the housing 120 of the computing device 102 of FIG. 2 as securing a peripheral device using the power connection port 122. The stylus 114 of FIG. 1 is shown as being secured against the housing 120. This may be performed using magnetism such that a protrusion of the stylus 114 is received within and formed complementary to the power connection port 122 shown in FIG. 2. This may include use of magnets on one or both of the power connection port 122 or the stylus 114, ferrous materials, and so on. In this way, the stylus 114 may be secured and made readily accessible to a user without adding additional hardware to the computing device 102. A design of the housing in relation the power connection port 122 may also aid in protecting the peripheral device, an example of which may be found in relation to the following figure.

Figure 4:
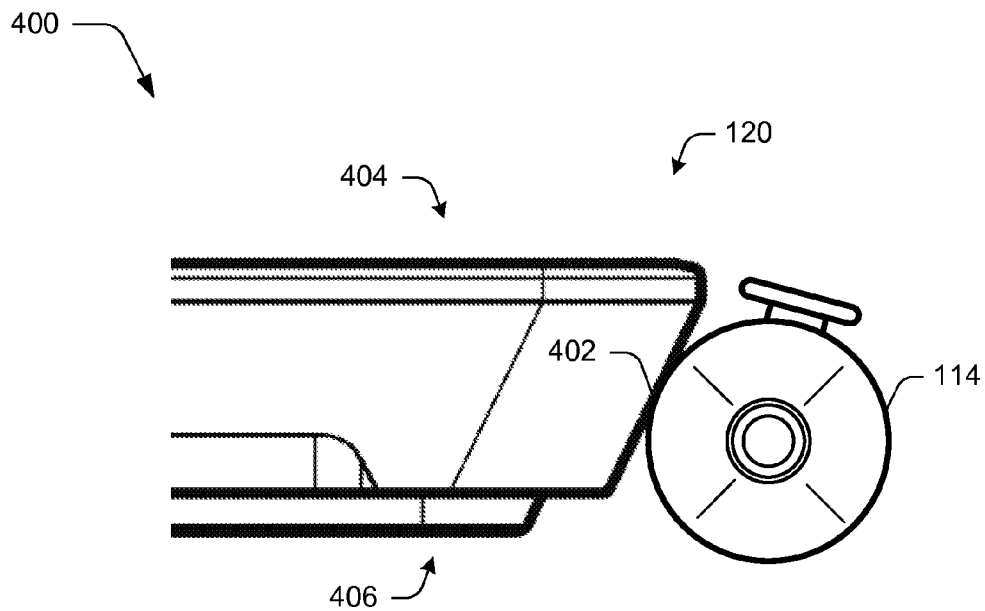
FIG. 4 depicts a view taken along an end of the side of the housing of an example implementation of the computing device of FIG. 3.

FIG. 4 depicts a view 400 taken along an end of the side of the housing 120 of the example implementation 300 of the computing device 102 of FIG. 3. As illustrated, the side surface 402 of the housing 120 form an angle, e.g., 26.5 degrees. In this example, this angle is formed such that a top surface 404 of the computing device 102 that includes the display device 112 is larger than a rear surface 404 of the computing device 102.

The stylus 114 is illustrated as secured against the side surface 402 of the housing 120. Because the side surface 402 forms an angle, the stylus 114 is protected against inadvertent detachment from forces approaching from the top surface 404 of the housing. However, the stylus 114 may also be easily grasped by the fingers of a user's hand when approaching the stylus 114 from the rear surface 406 of the housing 120. In this way, both protection and ease of interaction with the secured peripheral device are promoted.

Figure 5:
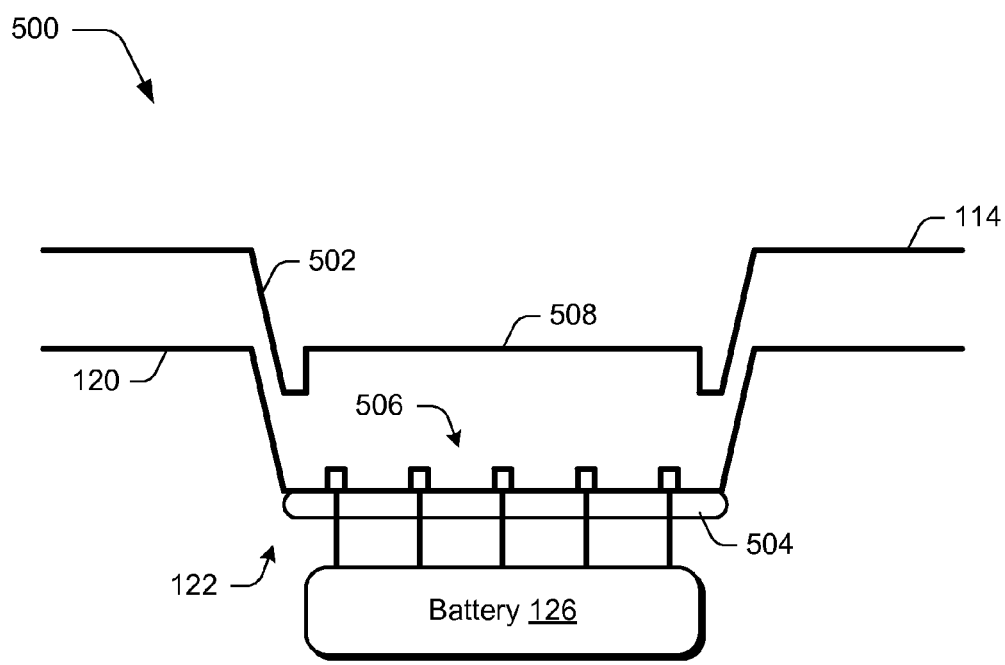
FIG. 5 depicts a cross section view taken along a longitudinal axis of the power connection port and the stylus.

FIG. 5 depicts a cross section view 500 taken along a longitudinal axis of the power connection port 122 and the stylus 114. The power connection port 122 is shown as forming a recess in the housing 120 of the computing device 102.

The stylus 114 is shown as including a protrusion 502 having a form factor that is complementary to a form factor of the power connection portion 122. This may be utilized to limit rotational movement of the stylus 114 in relation to the power connection portion 122.

As previously described, the stylus 114 may be secured to the power connection portion 122 using magnetism. This may be performed by using a magnet 504 in the power connection portion 122 that is configured to form a magnetic coupling with a ferrous material of the protrusion 502. A variety of other examples are also contemplated, such as to form the protrusion 502 using a magnet, the power connection portion 122 from a ferrous material that is not magnetized, and so on.

The power connection portion 122 in this example includes a plurality of pins 506 that are configured to provide an electrical coupling between the computing device 102 and the power adapter 124, such as to charge the battery 126. In one or more implementations, the peripheral device (e.g., the stylus 114) is not configured to avail itself of power of the computing device 102. Accordingly, the protrusion 502 of the stylus 114 may include one or more indentions 508 such that the protrusion 502 does not contact the pins 506. Other examples are also contemplated, such as to support contact in situations in which the peripheral device (e.g., stylus 114) is to receive power from the computing device 102, such as to charge a battery of the peripheral device. For example, the stylus 112 may include a passive oscillating circuit to receive power from the computing device 102. Accordingly, the protrusion 502 may be formed in a variety of ways to support a variety of different functionality, examples of which may be found in relation to the following discussion and corresponding figure.

Figure 6:
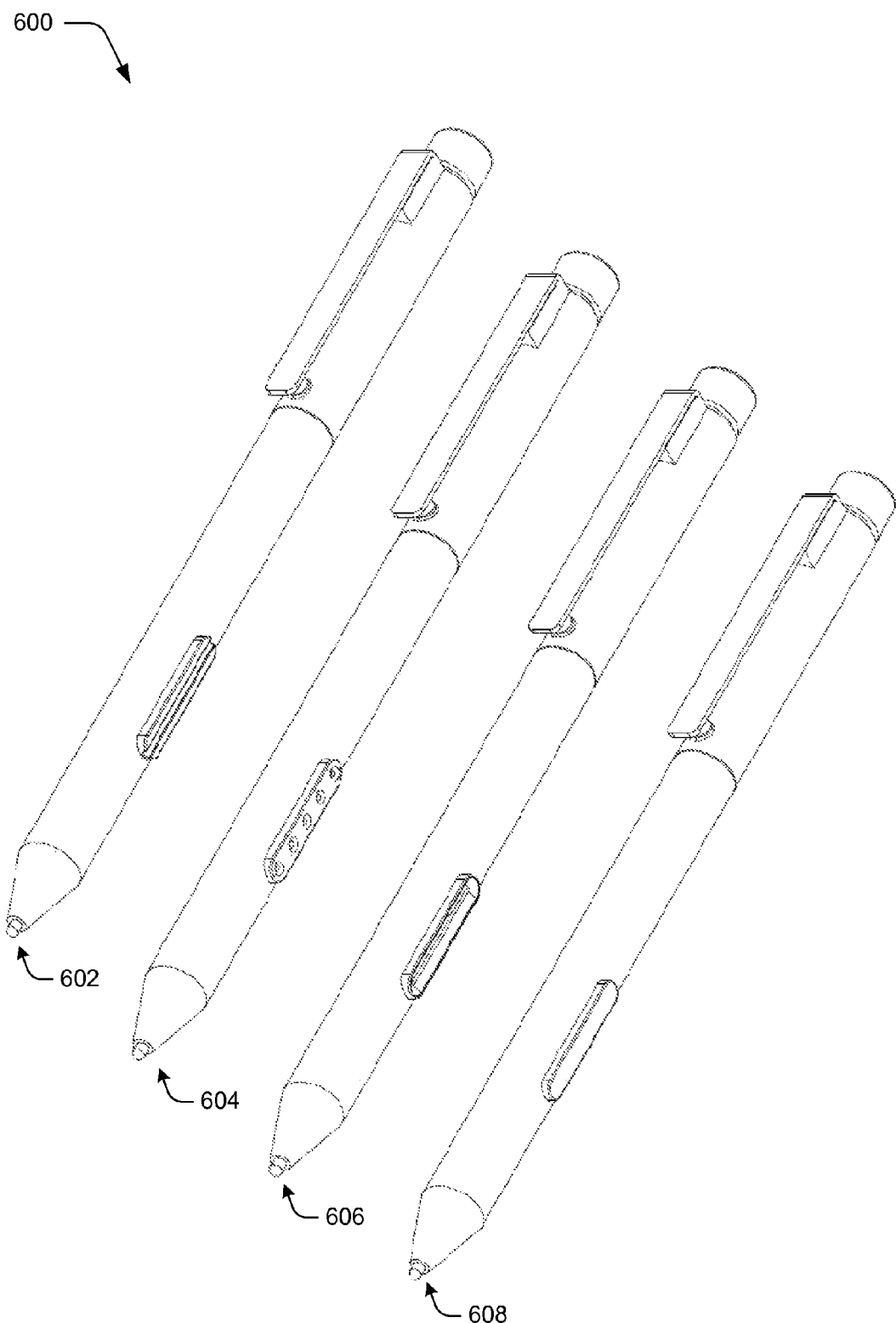
FIG. 6 depicts an implementation showing examples of the stylus of FIG. 5.

FIG. 6 depicts an implementation 600 showing examples of the stylus 114 of FIG. 5. This implementation includes illustrations of first, second, third, and fourth examples 602, 604, 606, 608 of a peripheral device configured as a stylus such that a housing of the stylus is formed to mimic a pen, although other examples are also contemplated. In the first example 602, the stylus includes a protrusion having a channel formed along a longitudinal axis of the protrusion. This channel may be configured such that the protrusion avoids contact with the pins 506 of the power connection portion and yet allows the protrusion to be disposed closer to the magnet 504. This may be used to increase the strength of a magnetic coupling between the protrusion and the magnet 504.

In the second example 604, the protrusion includes a series of dimples, each formed to avoid contact with a respective one of the pins 506 of the power connection portion 122. In the third example 606, a channel having bound ends is shown. Other examples are also contemplated in which contact is desired, one example of which is illustrated in the fourth example 608. It should be readily apparent that a wide variety of other designs of the protrusion are also contemplated without departing from the spirit and scope thereof.

The protrusion may also be leveraged to support functionality in addition to attachment to the computing device 102. The protrusion, for instance, may be configured to support an input to be provided to the computing device, such as through wireless functionality. For example, the protrusion may be configured to act as a selection input (e.g., a "click") of a cursor control device, such as a "right click" or "left click." In this way, the protrusion may also serve to support a variety of functionality in an efficient manner. Although a stylus 114 was described in the above examples, it should be apparent that other peripheral devices are also contemplated, such as cursor control devices (e.g., a mouse) or other input or output devices that may be configured to support use of the power connection port 122 to secure the device.

Example System and Device

Figure 7:
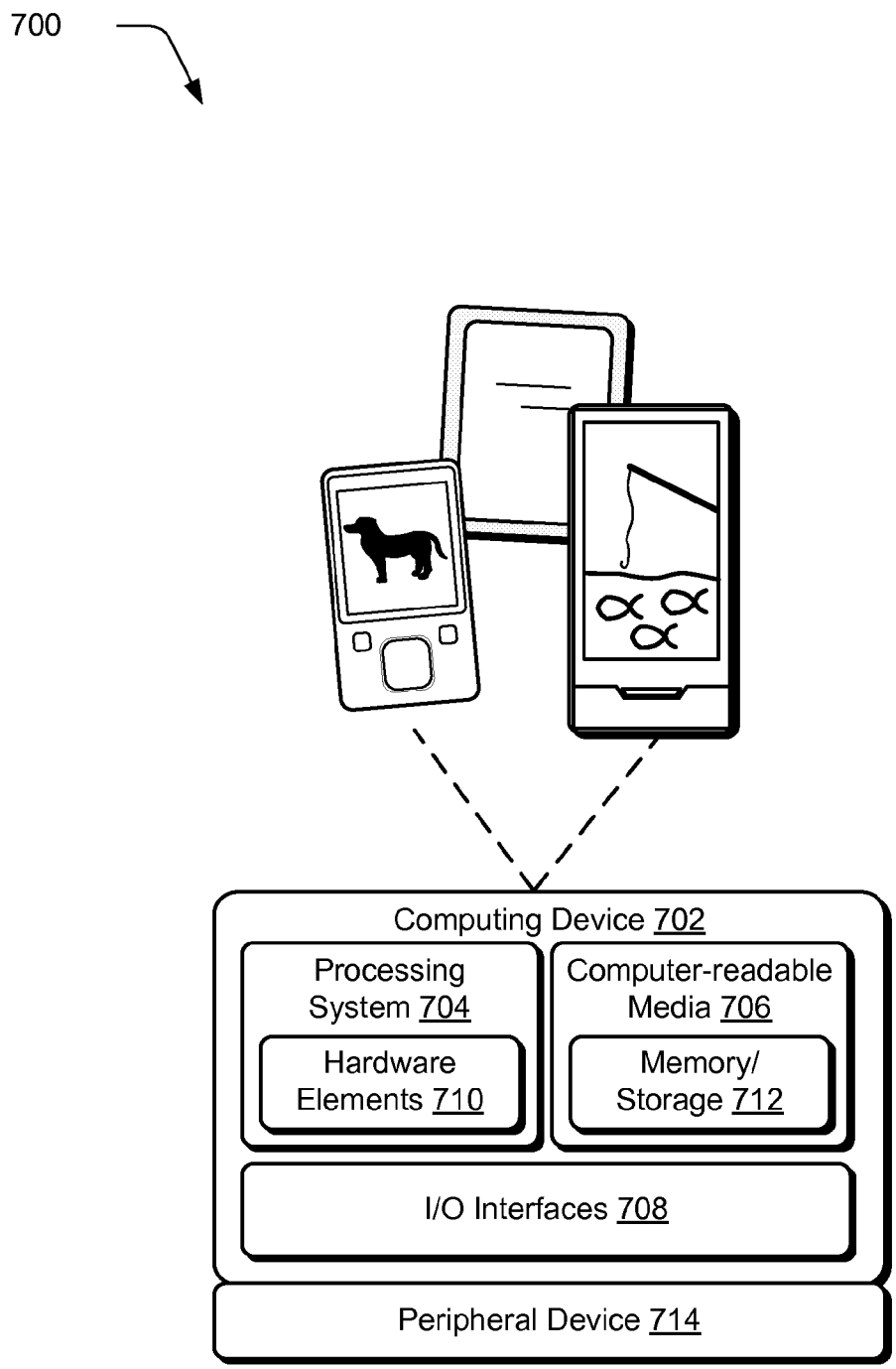
FIG. 7 illustrates an example system including various components of an example device that can be implemented as any type of computing device as described with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. The computing device 702 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways to support user interaction.

The computing device 702 is further illustrated as being physically coupled to a peripheral device 714 that is physically removable from the computing device 702, e.g., using magnetism. In this way, a variety of different input devices may be coupled to the computing device 702 having a wide variety of configurations to support a wide variety of functionality.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computing device comprising:
   a housing; and
   a power connection port, formed as a recess within the housing, that is configured to: form a physical coupling to a stylus sufficient to retain the stylus against the housing, the stylus extending along a central long axis, the physical coupling being such that when the stylus is coupled to the power connection port, the central long axis extends entirely along the outside of the computing device; and
   form an electrical coupling configured to receive power at the computing device from a power adapter.

2. A computing device as described in claim 1, wherein the power connection port is configured to receive the power from the power adapter to charge a battery disposed within the housing.

3. A computing device as described in claim 1, wherein the power connection port is configured to receive a protrusion of the stylus within the port.

4. A computing device as described in claim 3, wherein the protrusion is configured to be selectable by a user to initiate a function of the computing device.

5. A computing device as described in claim 1, wherein the power connection port is configured to provide power to the stylus.

6. A computing device as described in claim 5, wherein the power is provided to the stylus to charge a battery of the stylus.

7. A computing device as described in claim 1, wherein the power connection port is not configured to provide power to the stylus.

8. A computing device as described in claim 1, wherein the housing is configured accordingly to a mobile form factor that is configured to be grasped by one or more hands of a user.

9. A method comprising:
forming a physical coupling to a stylus by a power connection port formed as a recess within a housing of a computing device using magnetism that is sufficient to retain the stylus against the housing of the computing device, the stylus extending along a central long axis, the physical coupling being such that when the stylus is coupled to the power connection port, the central long axis extends entirely along the outside of the computing device; and
forming an electrical coupling using the power connection port that is configured to receive power at the computing device from a power adapter.

10. A method as described in claim 9, wherein at least one of the power connection port or the stylus includes a magnet.

11. A method as described in claim 9, wherein the power connection port is configured to receive the power from the power adapter to charge a battery disposed within the housing.

12. A method as described in claim 9, wherein the power connection port is configured to receive a protrusion of the stylus within the port.

13. A method as described in claim 12, wherein the protrusion is configured to be selectable by a user to initiate a function of the computing device.

14. A method as described in claim 9, wherein the power connection port is configured to provide power to the stylus.

15. A method as described in claim 9, wherein the power is provided to the peripheral device to charge a battery of the stylus.

16. A method as described in claim 9, wherein the power connection port is not configured to provide power to the stylus.

17. A computing device comprising:
a housing; and
a power connection port formed as a recess within the housing that is configured to:
    form a physical coupling to a stylus that is sufficient to retain the stylus against the housing using magnetism, the stylus extending along a central long axis, the physical coupling being such that when the stylus is coupled to the power connection port, the central long axis extends entirely along the outside of the computing device; and
    form an electrical coupling configured to receive power at the computing device from a power adapter.

18. A computing device as described in claim 17, wherein at least one of the power connection port or the stylus includes a magnet.

19. A computing device as described in claim 17, wherein the power connection port is configured to receive the power from the power adapter to charge a battery disposed within the housing.

20. A computing device as described in claim 17, wherein the power connection port is configured to receive a protrusion of the stylus within the port.

21. A computing device as described in claim 20, wherein the protrusion is configured to be selectable by a user to initiate a function of the computing device.

22. A computing device as described in claim 17, wherein the power connection port is configured to provide power to the stylus.

23. A computing device as described in claim 22, wherein the power is provided to the stylus to charge a battery of the stylus.

24. A computing device as described in claim 17, wherein the power connection port is not configured to provide power to the stylus.

25. A computing device as described in claim 17, wherein the housing is configured accordingly to a mobile form factor that is configured to be grasped by one or more hands of a user.

* * * * *